Palmer & Williams.
Harvester Rake.
Reissued Apr. 10, 1855.
No. 305
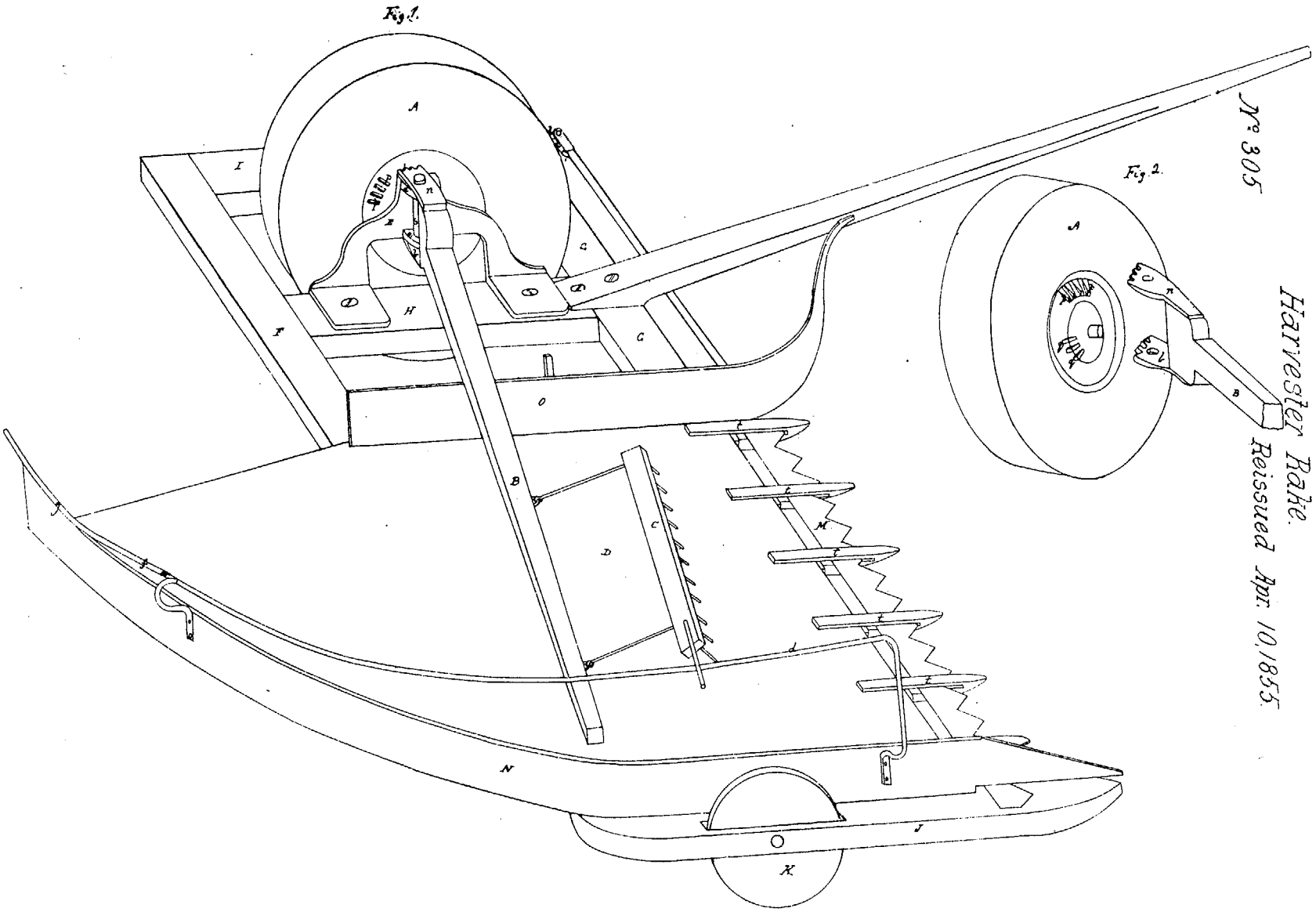

UNITED STATES PATENT OFFICE.

AARON PALMER, OF BROCKPORT, NEW YORK, AND S. G. WILLIAMS, OF JANESVILLE, WISCONSIN.

IMPROVEMENT IN HARVESTERS.

Specification forming part of Letters Patent No. 8,192, dated July 1, 1851; Reissue No. 305, dated April 10, 1855.

*To all whom it may concern:*

Be it known that we, AARON PALMER, of Brockport, in the county of Monroe and State of New York, and STEPHEN G. WILLIAMS, formerly of the same place, but now of Janesville, in the county of Rock and State of Wisconsin, have invented a new and Improved Harvesting-Machine; and we do hereby declare that the following is a full and exact description thereof, reference being had to the accompanying drawings, making a part of this specification—

Figure 1 being a perspective view of the entire machine, and Fig. 2 a perspective view of a portion thereof detached.

Similar letters indicate like parts in all the figures.

The frame of our harvesting-machine is composed of the side pieces, F G, the end pieces, I J, and the transverse piece H.

The main wheel A of the machine is placed between the end I and the transverse piece H of the frame, and has its bearings in the arch-support E, rising from the transverse piece H, and in a corresponding support rising from the end I of the machine.

D is the platform for the reception of the heads and upper portions of the stalks of the grain as they are severed by the cutting apparatus M, which is located at the front edge of the said platform. A fence or guard, O, arises from the inner edge of the platform D, and may be made straight, or it may be curved to correspond with the sweep of the inner end of the rake C. A curved guard, N, rises from the outer edge of the platform D to guide the grain as it is raked off. An inclined rail, *d*, is supported above the guard N, as represented in Fig. 1. At the rear end of the rail *d* a short rail or gate, *f*, is joined thereto, the rear end of which rests upon the guard N, and beyond the extremity of the hinged rail *f* a rail, *g*, surmounts the after edge of the guard N, which has an upward inclination.

The rake C may be connected to the operating-lever B by any suitable hinge or joint. The lever B has metallic plates *n b* projecting from the upper and lower side of its inner end, on which are cogs or teeth which together form a rack. These plates embrace the ears *e e*, that project outward from the wheel-bearing support E. A fulcrum-pin, S, passes down through the plates *n b* and through the ears *e e*, which hold the lever B in a horizontal position without any support at its outer end, and allows it to oscillate back and forth freely.

On the face of the wheel A are the teeth *p* and *q*, as shown in Fig. 2, which teeth form a portion of a pinion and mesh into the teeth of the rack above described when the wheel A is rotated, and thereby cause the lever B to turn back and forth upon its axis. When the lever B passes rearward the teeth of the rake C strike through the cut grain and rest upon the platform D, and carry the grain with them and discharge the same off the rear or inner edge of the rear of the platform at nearly right angles to the path of the machine and out of the way of the horses which draw the machine in their succeeding tour around the field. Just before the rake C reaches its extreme rearward position the pin *c*, which projects from its outward extremity, passes from beneath the hinged portion *f* of the inclined rail *d*, and when the lever B is turned forward the rake C is elevated from the platform D, as it is pushed forward, by the action of the pin *c* in passing up and bearing upon the inclined rail *d*, which enables it to surmount the cut grain preparatory to sweeping it off the platform D. The oscillating overhung-lever B is turned rearward by the action of the teeth *p* upon the teeth in the upper part of the rack *n*, and it remains in its extreme rearward position during a part of the revolution of the wheel A, where the teeth *q* strike into the teeth on the lower part of the rack *b* and carry the lever forward so far that the pin *c*, projecting from the rake C, will pass over the angle of the rail *d* and allow the said rake to fall on the butts of the cut grain near the front edge of the platform D. The instant the teeth *q* cease their action upon the teeth on the rack *b* the teeth *p* take into the teeth on the rack *n* and turn the rake and lever rearward again.

The arrangement of the operating-lever B is such as to enable the gearing which operates it to be located within the inner portion or inner circle of the platform, thereby preventing the access of the stalks of grain or grass to it, which would interfere with its free action and be liable to clog or break it.

The apparatus M for cutting the grain may be constructed and operated in any well-known or usual manner.

What we claim as our invention, and desire to secure by Letters Patent, is—

Discharging the cut stalks and heads of grain from the main platform D, on which they first fall, by means of the combination of the rake C with the overhung-lever B, moved by gearing located within the inner edge or circle of said platform, as herein set forth.

In testimony whereof we have hereunto signed our names before two subscribing witnesses.

AARON PALMER.
STEPHEN G. WILLIAMS.

Witnesses to A. Palmer's signature:
CHAS. WESLEY PALMER,
G. B. WHITESIDE.

Witnesses to S. G. Williams's signature:
LYMAN J. BARROWS,
JAS. H. OGILVIE.